(12) United States Patent
Al-Shalash (10) Patent No.: US 10,271,162 B2
(45) Date of Patent: Apr. 23, 2019

(54) EXTENSIBLE SOLUTION FOR DEVICE TO DEVICE DISCOVERY MESSAGE SIZE

(71) Applicant: Futurewei Technologies, Inc., Plano, TX (US)

(72) Inventor: Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/709,127

(22) Filed: May 11, 2015

(65) Prior Publication Data

US 2015/0327157 A1    Nov. 12, 2015

Related U.S. Application Data

(60) Provisional application No. 61/991,398, filed on May 9, 2014.

(51) Int. Cl.
| | |
|---|---|
| *H04W 4/02* | (2018.01) |
| *H04W 4/70* | (2018.01) |
| *H04W 8/00* | (2009.01) |
| *H04W 12/08* | (2009.01) |
| *H04W 48/16* | (2009.01) |
| *H04W 72/12* | (2009.01) |

(52) U.S. Cl.
CPC ............. *H04W 4/023* (2013.01); *H04W 4/70* (2018.02); *H04W 8/005* (2013.01); *H04W 48/16* (2013.01); *H04W 72/1263* (2013.01); *H04W 12/08* (2013.01)

(58) Field of Classification Search
CPC ..... H04W 4/023; H04W 8/005; H04W 48/16; H04W 72/1263
See application file for complete search history.

(56) References Cited

U.S. PATENT DOCUMENTS

| | | | |
|---|---|---|---|
| 8,078,742 B2 | 12/2011 | Blackwell et al. | |
| 2001/0007137 A1* | 7/2001 | Suumaki | H04L 1/0082 714/18 |
| 2002/0187789 A1* | 12/2002 | Diachina | H04W 72/02 455/452.1 |
| 2010/0165947 A1 | 7/2010 | Taniuchi et al. | |
| 2011/0188385 A1* | 8/2011 | Ozturk | H04L 1/0007 370/252 |
| 2013/0077529 A1 | 3/2013 | Lueckenhoff et al. | |
| 2013/0250803 A1* | 9/2013 | Abraham | H04L 67/16 370/254 |
| 2014/0056220 A1 | 2/2014 | Poitau et al. | |
| 2014/0112194 A1 | 4/2014 | Novlan et al. | |
| 2015/0155978 A1* | 6/2015 | Eriksson | H04L 1/0026 370/329 |

(Continued)

FOREIGN PATENT DOCUMENTS

| | | | | |
|---|---|---|---|---|
| GB | 2502581 B | * | 4/2014 | ............ H04W 8/005 |
| WO | 2013179268 A1 | | 12/2013 | |

*Primary Examiner* — Alex Skripnikov
*Assistant Examiner* — Nicole King
(74) *Attorney, Agent, or Firm* — Slater Matsil, LLP (57) ABSTRACT

A method for providing an extensible solution for discovery message size includes determining a capsule size at a layer one protocol of a user equipment operating in a cellular network. The capsule size is forwarded to a layer two protocol of the user equipment where it is adjusted to accommodate layer two overhead. The adjusted capsule size is then forwarded to a layer three protocol.

20 Claims, 7 Drawing Sheets

(56) References Cited

U.S. PATENT DOCUMENTS

2015/0208332 A1* 7/2015 Baghel .................. H04W 48/16
  370/255
2015/0319737 A1* 11/2015 Cheng ................... H04W 76/14
  370/329
2016/0338035 A1* 11/2016 Matsumoto ......... H04W 72/044

* cited by examiner

EXTENSIBLE SOLUTION FOR DEVICE TO DEVICE DISCOVERY MESSAGE SIZE

RELATED APPLICATIONS

This application claims the benefit of U.S. Provisional Application No. 61/991,398 filed May 9, 2014, entitled "An extensible solution for device to device discovery message size," and incorporated herein by reference in its entirety.

TECHNICAL FIELD

The present disclosure relates in general to device-to-device communications and more particularly to a method for providing an extensible solution for device to device discovery message size.

BACKGROUND

Proximity-based applications and services represent a fast growing social and technological trend that may have a major impact on evolution of cellular wireless/mobile broadband technologies. These services are based on the awareness of two devices, users, or other communication entities being close to each other and may include such applications as public safety operations, social networking, mobile commerce, advertisement, gaming, vehicle-to-vehicle, etc. Device to device (D2D) discovery within the cellular or long term evolution (LTE) network may be a first step to enable D2D communications service, or may be used to enable other proximity services not involving D2D communication. With direct D2D communication, user equipment (UE) may communicate directly with each other without involvement of a base station or an evolved node B (eNodeB). Device discovery involves discovering one or more other discoverable UEs within discovery range. Device discovery also involves being discovered by one or more other discovering UEs within discovery range.

There are many unresolved issues with respect to device discovery for D2D communication, including resource allocation and signaling, particularly for Proximity Service (ProSe) D2D discovery. One main unresolved issue is that of discovery message size. In designing the discovery message, discovery message size is a critical parameter that largely determines discovery range and resource consumption. The discovery message size dictates the format of the message in terms of number of physical resource blocks (PRBs) and subframes. The issue of discovery message size is one that the standards bodies continue to struggle with.

SUMMARY

In accordance with one embodiment, a method for providing an extensible solution for device to device discovery message size in a cellular network includes determining a capsule size at a layer one protocol of a user equipment operating in the cellular network. The capsule size is forwarded to a layer two protocol of the user equipment. The capsule size is adjusted to accommodate layer two overhead. The adjusted capsule size is then forwarded to a layer three protocol.

The present disclosure describes many technical advantages over conventional discovery messaging techniques. For example, one technical advantage is to determine a capsule size and provide the capsule size to a layer three protocol. Another technical advantage is to place discovery information at the layer three protocol into one or more capsule units each having the capsule size such that individual fields of the discovery information are not overlapped into two capsule units. Yet another technical advantage is to maintain discovery information transparency at the layer two protocol. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, reference numerals represent like parts, in which.

DETAILED DESCRIPTION

FIGS. 1 through 10, discussed below, and the various embodiments used to describe the principles of the present invention disclosed in this patent document are by way of illustration only and should not be construed in any way to limit the scope of the invention. Those skilled in the art will understand that the principles of the present invention may be implemented in any type of suitably arranged device or system. Features shown and discussed in one figure may be implemented as appropriate in one or more other figures.

Proximity Services (ProSe) consist of discovering mobile devices in physical proximity and direct communications between users with or without supervision from the LTE network. Proximity Services support public safety needs by providing a capability to discover users who are in close physical proximity and wish to have direct communications, including critical services for firefighters, police officers, and first responders. In addition, proximity discovery is seen as a potential enabler for a range of new and innovative proximity services, such as enhanced social networking, enhanced location services, vehicle-to-vehicle communications, and other applications. System enablers for ProSe include EPC-level ProSe Discovery, EPC support for WLAN direct discovery and communication, and direct discovery and direct communication. In ProSe communications, UEs that are near each other can communicate directly rather than via the cellular network. The ProSe discovery process identifies UEs that are near each other and enables operators to provide a highly power-efficient, privacy-sensitive, spectrally efficient and scalable proximate-discovery platform. The network controls the use of resources used for discovery. Signal timing, discovery signal design, payload definition, resource allocation, and resource selection are part of the discovery design.

From the foregoing, it may be appreciated by those skilled in the art that a need has arisen for a technique that addresses discovery message size that is not dependent on a total number of bits used in the discovery message. In accordance with the present disclosure, a method for providing an extensible solution for discovery message size is disclosed that greatly reduces and substantially eliminates the problems associated with current discovery message size techniques.

Figure 1:
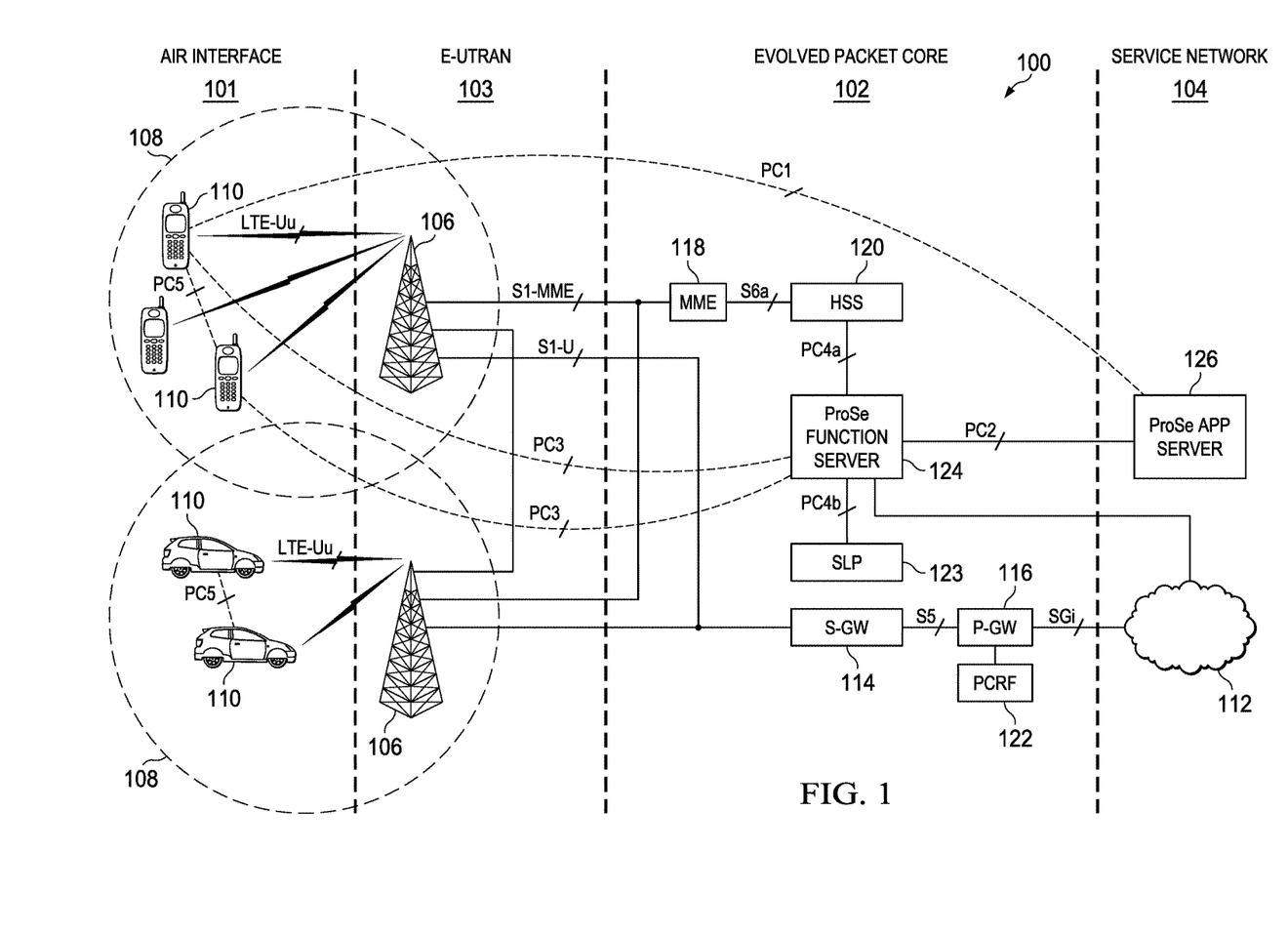
FIG. 1 illustrates a simplified example of a cellular network architecture.

FIG. 1 shows a simplified example of a cellular network architecture 100. Network architecture 100 includes an Air Interface network 101, an Evolved Packet Core (EPC) network 102, an Evolved Universal Terrestrial Radio Access Network (E-UTRAN) 103, and a Service Network 104. E-UTRAN 103 includes one or more evolved Node B (eNodeB) elements 106 managing several cells 108 within Air Interface network 101. Within cells 108, each user equipment (UE) 110 communicates using network architecture 100. eNodeB elements 106 provide functions for radio resource management, allocation of resources to UE 110, and routing of user plane data to a serving gateway in EPC 102. Multiple eNodeBs 106 are connected with each other for handover management of UE 110 from one cell 108 to another.

EPC 102 enables packet communication with Internet 112. EPC 102 includes Serving Gateways (S-GW) 114, Packet Gateways (P-GW) 116, Mobility Management Entity (MME) 118, Home Subscriber Service (HSS) server 120, a Secure User Plane (SUPL) Location Platform (SLP) server 123, Policy and Charging Rules Function (PCRF) server 122, and Proximity Service (ProSe) Function server 124. S-GW 114 is the node that terminates the interface towards E-UTRAN 103 and provides packet routing and forwarding, a local mobility anchor for handover operations, and user accounting. P-GW 116 performs UE 110 IP address allocation, transport level packet marking for downlinking, and uplink/downlink service level charging, gating, and rate enforcement. PCRF 122 checks that quality of service delivered to a UE 110 is compatible with a subscription profile of the UE 110. MME 118 handles the signaling between UE 110 and EPC 102, including paging information, UE identity and location, communication security, and load balancing. HSS 120 verifies UE 110 identities and operator subscriptions. The SLP 123 obtains location information for the UE 110.

The ProSe Function server 124 generates IDs of the ProSe users after being authorized by the HSS 120 and handles these IDs, along with their corresponding application layer user IDs. The ProSe Function server 124 also stores a list of applications IDs authorized to use EPC-level ProSe discovery. The ProSe Function server 124 also plays the role of location services client (SLP agent) communicating with the SLP 123 in order to be aware of the locations of UEs 110 and in order to be able to determine their proximity.

Service Network 104 includes a ProSe Application Server 126. The ProSe Application Server 126 contains one or more applications that may offer services based on the corresponding Application Programming Interfaces (APIs) for ProSe. The UEs 110 download the ProSe application from the ProSe Application Server 126. The ProSe Application Server 126 also stores identities of ProSe users, as defined at the network level, and maps these identities to application layer user identities, which identifies specific users within an application. Moreover, the ProSe Function ID corresponding to each user is also saved in the ProSe Application Server 126.

The interfaces between the elements in network architecture 100 are defined as follows. The PC1 interface between the ProSe application in the UE 110 and the ProSe Application Server 126 is used to define application level signaling requirements. The PC2 interface between the ProSe Application Server 126 and the ProSe Function server 124 is used for EPC-level ProSe discovery. The PC3 interface between the UE 110 and the ProSe Function server 124 relies on EPC user plane for transport in authorizing ProSe Direct Discovery and EPC-level ProSe Discovery requests and performs allocation of ProSe Application Codes corresponding to ProSe Application Identities used for ProSe Direct Discovery. The PC3 interface is also used to define the authorization policy per Public Land Mobile Network (PLMN) for ProSe Direct Discovery (applicable to Public Safety and non-Public Safety) and communication (applicable to Public Safety) between UE 110 and ProSe Function server 124. The PC4a interface between the HSS 120 and ProSe Function server 124 is used to provide subscription information in order to authorize access for ProSe Direct Discovery and ProSe Direct Communication on a per PLMN basis and for retrieval of EPC-level ProSe Discovery related subscriber data. The PC4b interface between the SLP server 123 and the ProSe Function server 124 is used by the ProSe Function server 124 to query the SLP server 123 for location information of UE 110. The PC5 interface between ProSe-enabled UEs 110 is used for control and user plane information exchange in performing ProSe Direct Discovery and ProSe Direct Communication. The S6a interface between HSS 120 and MME 118 is used to download ProSe related subscription information to MME 118 during an E-UTRAN attach procedure or to inform MME 118 of changes to subscription information in the HSS 120. The S1-MME interface is used to provide an indication to eNodeB 106 that the UE 110 is authorized to use ProSe Direct Discovery. The S1-U interface is the user plane traffic link between eNodeB 106 and S-GW 114. The S5 interface provides user plane tunneling and tunnel management between S-GW 114 and P-GW 116. The S5 interface is used for S-GW relocation due to UE mobility and is used if the S-GW needs to connect to a non-collocated P-GW for the required packet data network (PDN) connectivity. The SGi interface interconnects the P-GW 116 and the PDN or Internet 112. PDN or Internet 112 may be an operator-external public or private packet data network or an intra-operator packet data network.

Figure 2:
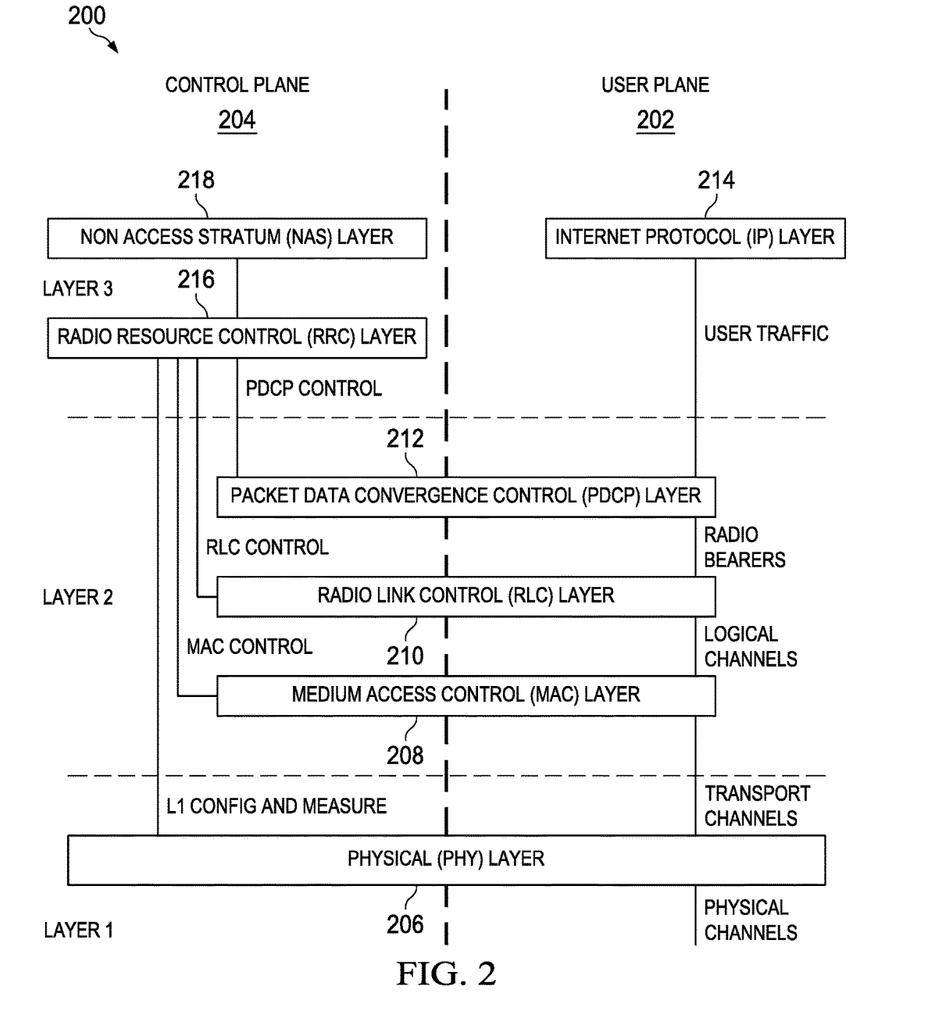
FIG. 2 illustrates a protocol layer architecture defining information sent over a radio link in the network architecture.

FIG. 2 shows the protocol layer architecture 200 defining information sent over a radio link in network architecture 100. The protocol layer architecture is divided into a user plane protocol stack 202 and a control plane protocol stack 204. The user plane 202 provides the data packets generated by the UE 110 application. The control plane 204 provides control and signaling information for the UE 110 radio link. The user plane 202 and the control plane 204 share a physical (PHY) layer protocol 206, a medium access control (MAC) layer protocol 208, a radio link control (RLC) layer protocol 210, and a packet data convergence control (PDCP) layer protocol 212. The user plane 202 includes an Internet Protocol (IP) layer 214 application for generation of user traffic. The control plane 204 includes a radio resource control (RRC) protocol 216 and a non-access stratum (NAS) protocol 218. The PHY layer protocol 206, defined as a Layer 1 protocol, is responsible for mapping between physical channels and transport channels used by the MAC layer protocol 208 for receipt and transmission over the air interface between eNodeB 106 and UE 110. Layer 2 protocols include the MAC layer protocol 208, the RLC layer protocol 210, and the PDCP layer protocol 212. The MAC layer protocol 208 is responsible for mapping between logical channels and transport channels. The RLC layer protocol 210 handles segmentation and reassembly for mapping between logical channels and radio bearers. The PDCP layer protocol 212 performs header compression and decompression of user traffic for the IP layer application. Layer 3 protocols include the RRC layer protocol 216, the NAS layer protocol 218, and any other upper layer application protocols. The RRC layer protocol 216 broadcasts system information related to non-access stratum and access stratum, controls a RRC connection between UE 110 and eNodeB 106, and provides connection mobility procedures. The NAS layer protocol 218 is the highest stratum of the control plane and performs connection, mobility, and session management by conveying signaling information between UE 110 and MME 108.

The RLC layer protocol 210 offers three kinds of data transfer services to the higher layers. The services are transparent mode, unacknowledged mode, and acknowledged mode data transfer. In general, for unacknowledged mode acknowledged mode data transfer, the RLC layer protocol 210 receives SDUs from the higher layers. The SDUs are segmented and/or concatenated to PDUs of fixed length. The RLC layer protocol 210 adds a header and PDUs are placed in a retransmission buffer and transmission buffer. The PDUs are then scheduled for delivery to the MAC layer protocol 208, with RLC control PDUs on one logical channel and data PDUs on another logical channel. The retransmission buffer receives acknowledgements from the receiving side used to indicate retransmissions of PDUs and when to delete a PDU from the retransmission buffer. In the transparent mode, no RLC layer protocol segmentation is performed. The transparent mode is used in discovery.

ProSe Direct Discovery is defined as the process that detects and identifies another UE in proximity using E-UTRA direct radio signals. There are two types of ProSe Direct Discovery: open and restricted. Open is the case where there is no explicit permission that is needed from the UE being discovered, whereas restricted discovery only takes place with explicit permission from the UE that is being discovered. ProSe Direct Discovery can be a stand-alone service enabler that could, for example, use information from the discovered UE for certain applications in the UE that are permitted to use this information, e.g. "find a taxi nearby" or "find me a coffee shop". Additionally, depending on the information obtained, ProSe Direct Discovery can be used for subsequent actions, e.g. to initiate ProSe Direct Communication.

ProSe Direct Discovery follows two operating models—Model A ("I am here") and Model B ("who is there?"/"are you there?"). In Model A, UEs 110 that are participating in ProSe Direct Discovery have two roles: Announcing UE and Monitoring UE. In an announcing role, the UE 110 announces certain information that is used by UEs 110 in proximity that have permission to discover. In a monitoring role, the UE 110 monitors certain information of interest in proximity of announcing UEs. In model A, the announcing UE 110 broadcasts discovery messages at pre-defined discovery intervals and the monitoring UEs 110 that are interested in these messages read them and process them. The UE acts as "announcing UE" only in the band designated by the serving PLMN but may act as a "monitoring" UE also in the resources of the serving PLMN and Local PLMNs. Model A is considered an "I am here" model since the announcing UE 110 would broadcast information about itself in the discovery message. In Model B, UEs 110 that are participating in ProSe Direct Discovery have two roles: Discoverer UE and Discoveree UE. In a discoverer role, the UE 110 transmits a request containing certain information about what it desires to discover. In the discoveree role, the UE 110 that receives the request message can respond with some information related to the discoverer's request. Model B is considered a "who is there/are you there" model since the discoverer UE sends information about other UEs that it would like to receive responses from, e.g. the information can be about a ProSe Application Identity corresponding to a group and the members of the group can respond.

Figure 3:
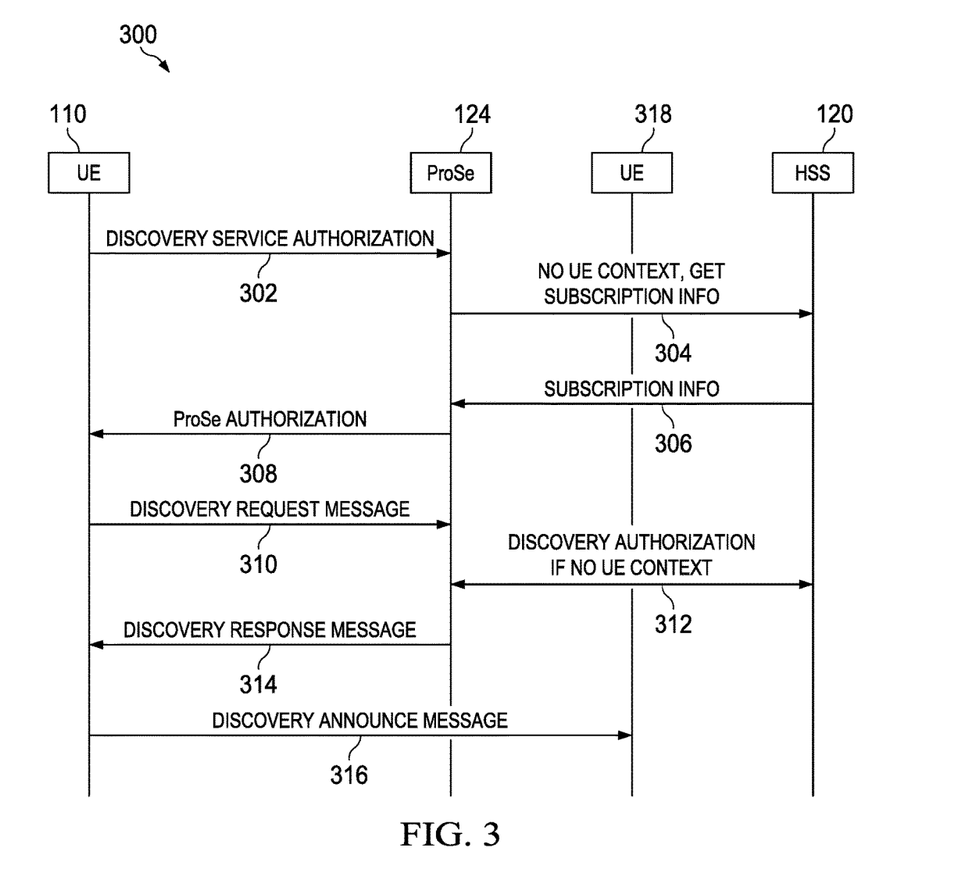
FIG. 3 illustrates a flow for an announcing operation performed by user equipment in the network architecture to initiate device-to-device communications.

FIG. 3 shows a flow 300 for an announcing operation. The announcing operation begins by the UE 110 requesting a discovery service authorization 302. If the ProSe Function server 124 does not have a context entry for UE 110, the ProSe Function server 124 sends a request 304 for subscription information to HSS 120. HSS 120 will return subscription information 306 and ProSe Function server 124 will create a context entry for UE 110. ProSe Function server 124 will then send a ProSe authorization message 308 to UE 110. If the UE 110 is authorized to announce in its home PLMN and is triggered to announce, the UE 110 establishes a secure connection with the ProSe Function server 124 and sends a Discovery Request message 310 for announcing. The Discovery Request message 310 includes a ProSe Application ID, a UE Identity, an announce command, and an Application ID. The ProSe Application ID indicates what the UE is interested to announce. The UE Identity identifies the UE sending the Discovery Request message. The announce command indicates that the UE is in an announcing role. The Application ID represents a unique identifier of the UE application that has triggered the transmission of the Discovery Request message. The ProSe Function server 124 checks again for the authorization of the application represented by the Application ID. If there is no associated UE context, the ProSe Function server 124 checks with HSS 120 for discovery authorization 312 and creates a new context for this UE 110 that contains the requisite subscription parameters. If the UE 110 does not issue a new announce request within a set period of time, the ProSe Function server 124 removes the context entry related to the requested ProSe Application ID. If the Discovery Request is authorized, then the ProSe Function server 124 checks whether the UE 110 is authorized to use the ProSe Application ID contained in the Discovery Request message. If the UE 110 is authorized to use that ProSe Application ID, then the ProSe Function server 124 responds with a Discovery Response message 314. The Discovery Response message 314 includes a ProSe Application Code and validity timer. The ProSe Application Code is provided by the ProSe Function server 124 and corresponds to the ProSe Application ID that was contained in the Discovery Request message. The validity timer indicates for how long this ProSe Application Code is valid. The UE 110 is authorized to announce this ProSe Application Code for the duration of the validity timer and if it remains in its home PLMN. When the validity timer expires or the UE changes its registered PLMN, the UE 110 needs to request a new ProSe Application Code. The UE 110 may now start announcing 316, to the UE 318, the provided ProSe Application Code in its home PLMN using the radio resources authorized and configured by E-UTRAN to be used for ProSe operations.

Figure 4:
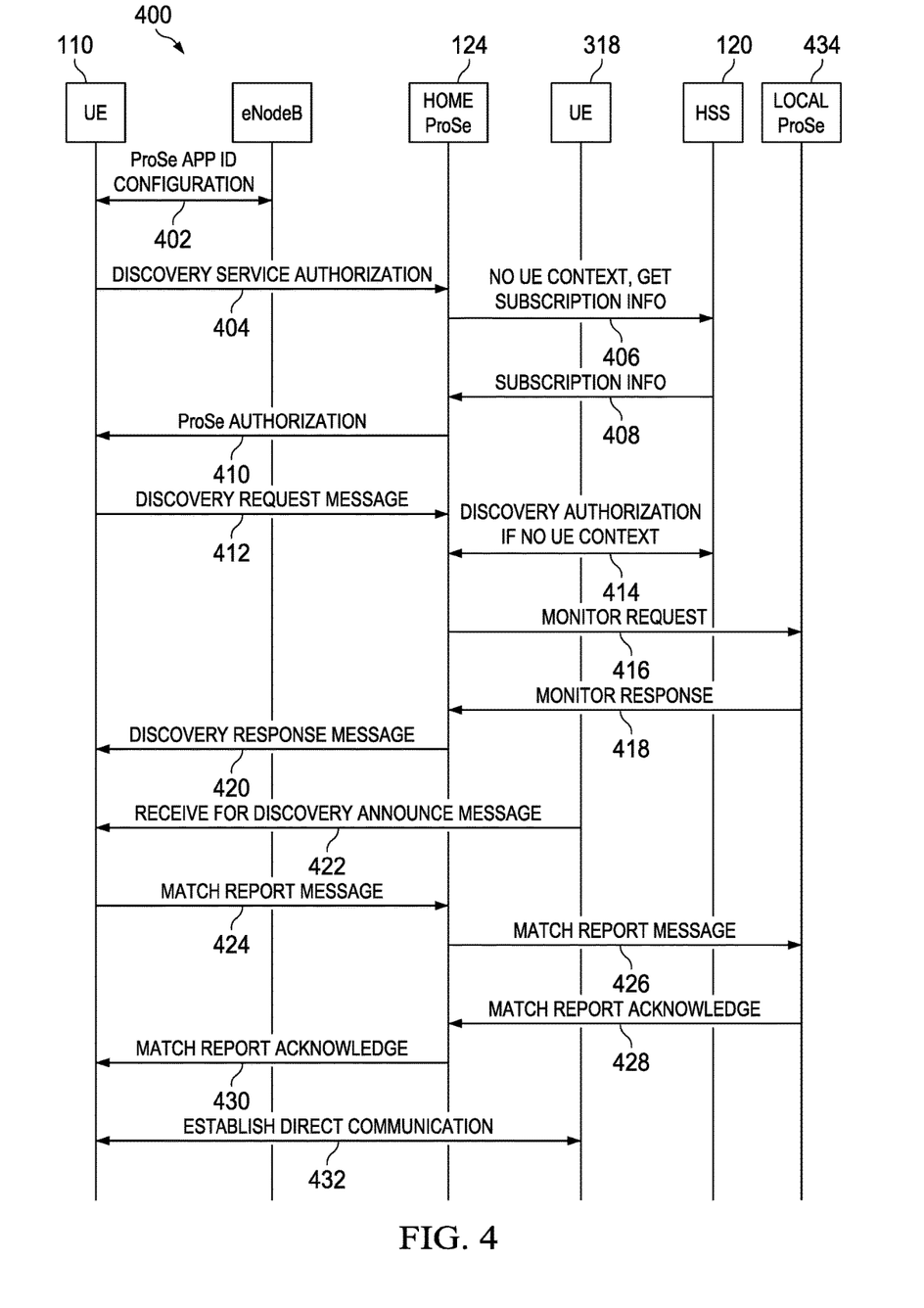
FIG. 4 illustrates a flow for a monitoring operation performed by user equipment in the network architecture to initiate device-to-device communications.

FIG. 4 shows a flow 400 for a monitoring operation. Initially, the UE 110 is configured 402 by eNodeB 438 with the data structure of the ProSe Application IDs corresponding to PLMNs the UE 110 is authorized to monitor. The monitoring operation begins by the UE 110 requesting a discovery service authorization 404 in a similar manner as discussed above for the announcing operation. If the ProSe Function server 124 does not have a context entry for UE 110, the ProSe Function server 124 sends a request 406 for subscription information to HSS 120. HSS 120 will return subscription information 408 and ProSe Function server 124 will create a context entry for UE 110. ProSe Function server 124 will then send a ProSe authorization message 410 to UE 110. If the UE 110 is authorized to monitor in at least one PLMN and is interested in monitoring certain ProSe Application ID(s), the UE 110 establishes a secure connection with ProSe Function server 124 and then send a Discovery Request message 412 for monitoring. The Discovery Request message 412 includes one or more ProSe Application ID(s), UE Identity, monitor command, and Application ID. The ProSe Application ID(s) indicate what the UE is interested in monitoring. The UE Identity identifies the UE sending the Discovery Request message. The monitor command indicates that the UE is in a monitoring role. The Application ID represents a unique identifier of the application that has triggered the transmission of the Discovery Request message. The ProSe Function server 124 checks again for the authorization of the application represented by the Application ID. If there is no associated UE context, the ProSe Function server 124 checks with HSS 120 for discovery authorization 414 and create a new context for this UE 110 that contains the requisite subscription parameters. The subscription parameters include the PLMNs that this UE is allowed to perform discovery. If the UE 110 does not issue a new monitor request within a set period of time, the ProSe Function server 124 removes the context entry related to the requested ProSe Application ID. Upon authorization, the ProSe Function server 124 in the home PLMN contacts, in a monitor request message 416, as needed, other PLMNs, such as local ProSe Function Server 434, that are indicated by the ProSe Application ID(s) sent by the UE 110 in order to resolve the corresponding ProSe Application ID Name(s) to ProSe Application Code(s) and/or a ProSe Application Mask. The communication may also include the UE identity information in order to allow the ProSe Function server 434 in the Local PLMN to perform charging. If the ProSe Function server 434 of the Local PLMN stores valid ProSe Application Code(s) corresponding to the requested ProSe Application ID Name(s), then the ProSe Function server of the Local PLMN returns, in a monitor response message 418, the related ProSe Application Code(s) and/or ProSe Application Mask(s) and the corresponding time interval for each. The ProSe Function server 124 in the home PLMN responds with a Discovery Response message 420. The Discovery Response message 420 includes one or more Discovery Filter(s) and a Filter ID) The Discovery Filter is a container of a ProSe Application codes, zero or more ProSe Application Mask(s), and Time To Live values. These are used by the monitoring UE to match ProSe Application Codes that are received on the PC5 interface for Direct Discovery. The TTL(s) in the Discovery Filter(s) indicates for how long the Discovery Filter(s) is going to be valid. The UE may start monitoring 422 using the Discovery Filter(s) in the radio resources that are authorized and configured by the PLMN(s) to be used for ProSe operation.

If the UE receives one or more announce messages 422 having ProSe Application Code(s) that match the Discovery Filters and does not have ProSe Application ID(s) already locally stored that correspond to this ProSe Application Code(s), the UE (re)establishes a secure connection with the ProSe Function server 124 in HPLMN and sends a Match Report (ProSe Application Code(s), UE Identity, Monitored PLMN ID) message 424 to the ProSe Function server 124 in the home PLMN. The ProSe Application Code is the code that the corresponding Discovery Filter of the UE matched. The Monitored PLMN ID is the PLMN in which the UE has monitored the ProSe Application Code. The ProSe Function server 124 checks the context for this UE that contains its subscription parameters. The subscription parameters include the PLMN where this UE is allowed to perform discovery. The ProSe Function server 124 analyzes the ProSe Application Code received from the UE. If the PLMN ID that assigned the given ProSe Application Code is another Local PLMN, the ProSe Function server 124 in the home PLMN sends a Match Report (ProSe Application Code(s), UE identity, Monitored PLMN ID) message 426 to the ProSe Function server 434 of the PLMN that assigned the ProSe Application Code. The UE identity information can be used by the ProSe Function server 434 in the Local PLMN to perform charging. The ProSe Function server 434 in the local PLMN ensures that the received ProSe Application Code is authorized to be transmitted on the monitored PLMN (the pair of ProSe Application Code and the monitored PLMN is stored in the UE context). The ProSe Function server 434 in the local PLMN analyzes the ProSe Application Code(s) received from the UE and checks whether the received ProSe Application Code(s) is still valid. If the ProSe Application Code is confirmed, then the ProSe Function server 434 in Local PLMN sends a Match Report Acknowledgement 428 (ProSe Application ID Name (s), validity timer(s)). This message may also contain certain metadata corresponding to the ProSe Application ID Name, e.g., postal address, phone number, URL, etc. The ProSe Function server 124 in the home PLMN responds to the UE with Match Report Acknowledgment (ProSe Application ID(s), validity timer(s)) message 430 to the UE 110. This message may also contain certain metadata corresponding to the ProSe Application ID Name, e.g., postal address, phone number, URL etc. The validity timer(s) indicates for how long the mapping of ProSe Application Code(s) and ProSe Application ID(s) are valid. The UE 110 stores the mapping of ProSe Application Code(s) and corresponding ProSe Application ID(s) for the duration of their validity timer. The UE 110 can then begin to establish direct communication 432 with the matching UE 318.

In device-to-device (D2D) discovery, each UE 110 has a signature or discovery message that it can broadcast over the air. The transmissions of discovery signals can be done in designated time/frequency resources, specifically allocated for device discovery. Other UEs 110 may listen for these discovery signatures or messages and, upon receiving them, decode them to identify each transmitting UE 110 in proximity. UE 110 may refer to any mobile device, fixed device, vehicle, or any other device with wireless communication capability. Once authorized and provisioned, the "Announcing UE" will transmit the Discovery Message(s) via the PC5 interface.

Figure 5:
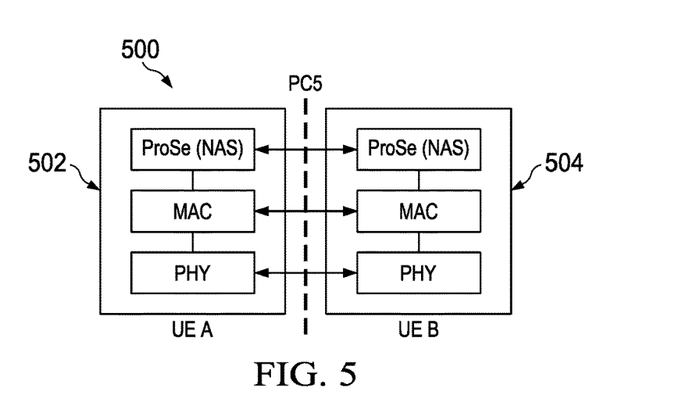
FIG. 5 illustrates a protocol stack between user equipment in the network architecture for direct discovery.

FIG. 5 shows the PC5 interface protocol 500 between UEs 502 and 504 for direct discovery. An announcing UE 502 transmits a Discovery Message on the discovery resources, where a monitoring UE 504 would screen these resources to filter for information of interest. The discovery resources are either configured by the network or could be pre-configured in the device. As shown in FIG. 5, discovery messages are transparent to RLC/PDCP/RRC. That means there is no RRC layer involved and no dedicated signaling procedure between two devices using direct discovery, nor direct communication. The MAC layer receives the discovery message directly from higher layers, such as the NAS layer, and uses a Sidelink Discovery Channel (SL-DCH) to map the discovery message to a Physical Sidelink Discovery Channel (PSDC) for transmission by the PHY layer.

Figure 6:
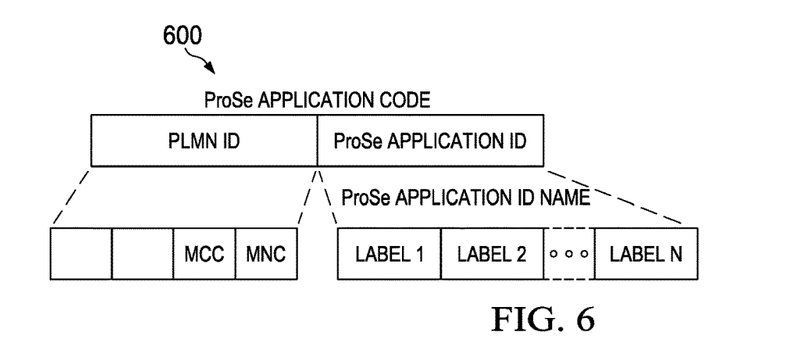
FIG. 6 illustrates one example of a structure for a discovery message.

FIG. 6 shows one example of a structure for a Discovery Message 600. As shown in FIG. 6, the Discovery Message is comprised of a ProSe Application Code combined with some supporting information. The "Announcing UE" receives the ProSe Application Code from the ProSe Function server 124 via the Discovery Response message, as discussed above. A "Monitoring UE" will filter for Discovery Messages transmitted on defined resources on the physical layer that satisfy its Discovery Filter received from the ProSe Function server 124 via the Discovery Response message. The ProSe Application Code is composed of two parts—a PLMN ID and a ProSe Application ID. The PLMN ID uniquely identifies the PLMN of the ProSe Function server 124 that has assigned the ProSe Application ID. The PLMN ID is composed of two labels—MCC and MNC. MCC contains the Mobile Country Code of the ProSe Function server 124 that has assigned the ProSe Application ID. MNC contains the Mobile Network Code of the ProSe Function server 124 that has assigned the ProSe Application ID. The ProSe Application ID is identified by a ProSe Application ID Name, which is a data structure characterized by different levels (string of labels) to enable partial matching (e.g., broad-level business category (Level 0)/business sub-category (Level 1)/business name (Level 2)/shop ID (Level 3)).

A wide range of discovery message sizes has been suggested by the standards bodies. Radio Access Node 1 (RAN1) used 104 bits for simulation evaluations. However, SA2 later provided guidance that the expected size of the discovery information was about double RAM's assumption (192 bits for non-public safety open discovery and 198 bits for public safety). Finally, in order to accommodate all of the discovery information, plus the integrity check, it was agreed that the size of the discovery message could be as large as 256 bits, not accounting for the L1 CRC. Furthermore, requirements have not been finalized for other use cases, such as non-public safety restricted discovery. Therefore, it cannot be guaranteed that even larger discovery message sizes may be required in a future release.

Figure 7:
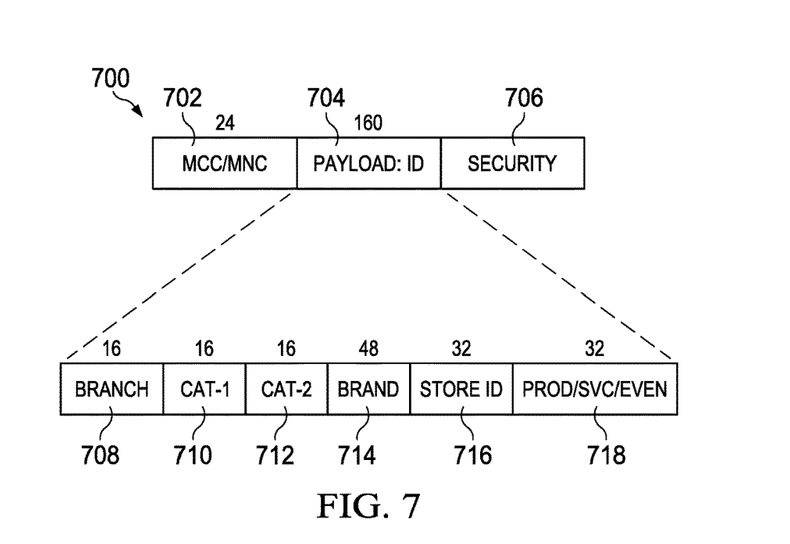
FIG. 7 illustrates one example structure of a proximity service application code included in a discovery message for open discovery.
Figure 8:
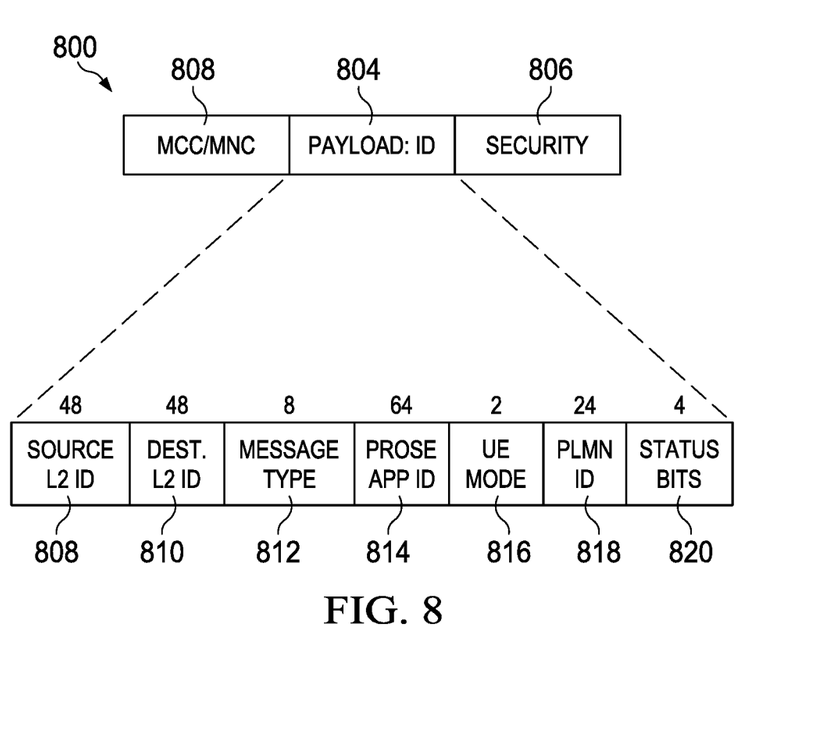
FIG. 8 illustrates an example of discovery information used in a public safety environment.

FIG. 7 provides one example structure 700 of a ProSe Application Code for open discovery. Structure 700 includes MCC/MNC 702 having 24 bits, payload ID 704 having 160 bits, and security 706. Payload ID 704 includes branch 708 having 16 bits, Cat-1 710 having 16 bits, Cat-2 712 having 16 bits, brand 714 having 48 bits, store ID 716 having 716 bits, and Prod/Svc/Even 718 having 32 bits. It is clear from FIG. 7 that non-public safety discovery information comprises several fields, ranging in size from 16 to 48 bits. FIG. 8 shows an example 800 of discovery information for a public safety environment. Example 800 includes MCC/MNC 802, payload: ID 804, and security 806. Payload ID 804 includes source L2 ID 808 having 48 bits, destination L2 ID having 48 bits, message type 812 having 8 bits, prose App ID 814 having 64 bits, UE mode 816 having 2 bits, PLMN ID 818 having 24 bits, and status bits 820 having 4 bits. In this example, the information also comprises several fields, ranging in size from 4 bits to 64 bits. From FIGS. 7 and 8, there is no consensus on discovery message size and individual field sizes have yet to be completely established.

One approach to address the message size issue is to use RLC segmentation and reassembly. However, such an implementation would create additional overhead in the form of RLC and MAC headers in the discovery message. Discovery message transmissions would no longer be transparent at the Layer 2 level. Furthermore, discovery resources are particularly vulnerable to interference from collisions and near-far effects. If the RLC layer protocol is used to segment and reassemble the discovery information, discovery information fields will be segmented into different segments. Any lost discovery segment would translate into complete loss of discovery information as a complete discovery information field would not be received. Therefore, discovery performance is expected to suffer significant degradation. RLC segmentation/reassembly is thus not a good solution to address the discovery message size problem.

An alternative solution is for the Layer 2 protocol of the UE 110 to provide a "capsule size" to the upper Layer 3 ProSe Layer (NAS) protocol that will flexibly define a size of the discovery message. The ProSe Layer creates one or more discovery information fields to fill capsule units. The ProSe Layer can select to transmit one or several of the discovery information fields in a single discovery capsule unit. The ProSe Layer may use one or more transmissions of capsule units for all of the discovery related information. In addition, the information to be transmitted in each discovery capsule unit may be tailored according to the requirements of different discovery scenarios and applications (e.g. open discovery and restricted discovery). All of this can be achieved, while the content of each discovery capsule unit remains transparent to Layer 2 protocols.

In order not to have the same issues as RLC, the ProSe layer does not split a discovery field across different discovery capsule units. In this manner, each discovery information field is independently decodable by a receiving UE. Furthermore, if a UE does not receive all of the discovery capsule units by an announcing UE, the monitoring UE can still obtain part of the discovery information and in the form of complete discovery information fields. Due to the hierarchical nature of open discovery information, this may often be sufficient for partial matching purposes.

At the PHY layer protocol, the size of discovery resources can be defined based on discovery performance requirements. Since PHY layer attributes for the discovery message (e.g. modulation and coding, CRC length) are predefined, the UE can readily calculate the capsule size. Since this capsule size is the size of the discovery capsule unit that the ProSe layer will provide to Layer 2, the capsule size should also exclude any Layer 2 overhead. After calculation in Layer 1 and adjustment in Layer 2, the capsule size is advertised to the ProSe layer protocol in Layer 3. The capsule size advertised to the upper layer is based on a transport block size defined by the physical layer. There may be some fixed length fields that are added at Layer 2, and hence need to be subtracted from the transport block size defined by Layer 1. Accordingly, the UE 110 calculates a discovery message capsule size based on the discovery modulation code scheme (MCS) and discovery resource size in resource blocks (RBs) assigned by eNodeB 106 with Layer 1 and Layer 2 overhead (e.g. CRC) being excluded from the capsule size reported to the ProSe layer.

Figure 9:
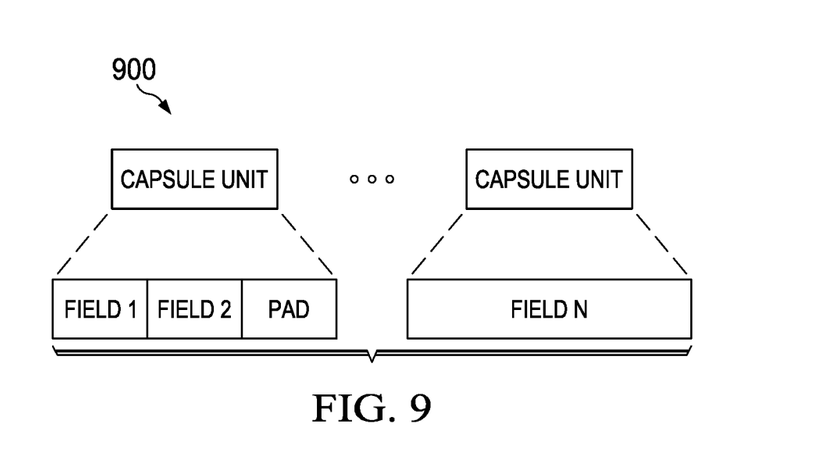
FIG. 9 illustrates how discovery fields are placed into capsule units by an upper layer of the protocol layer architecture.

FIG. 9 shows how discovery fields are placed into capsule units 900. The ProSe layer protocol in Layer 3 generates the discovery information and partitions the discovery information into a plurality of discovery fields of various sizes. The ProSe layer protocol places the discovery fields into capsule units. Based on the capsule size provided by the MAC layer protocol in Layer 2, discovery fields are placed into capsule units such that an individual field placed in one capsule unit does not overlap into a second capsule unit. Padding bits are used to fill out the capsule unit if the discovery fields placed therein do not occupy the entire size of the capsule unit.

In order to facilitate the need to not segment a discovery information field, the minimum size of a discovery capsule should be selected large enough to accommodate the largest field of the discovery information. Based on FIGS. 7 and 8, the largest discovery information field is currently expected to be 64 bits. In addition, each discovery Capsule Unit will include an independently generated 32-bit integrity check (MIC). Based on this, the original RAN1 estimate of 104 bits is reasonable for the minimum size of the discovery Capsule Unit.

Figure 10:
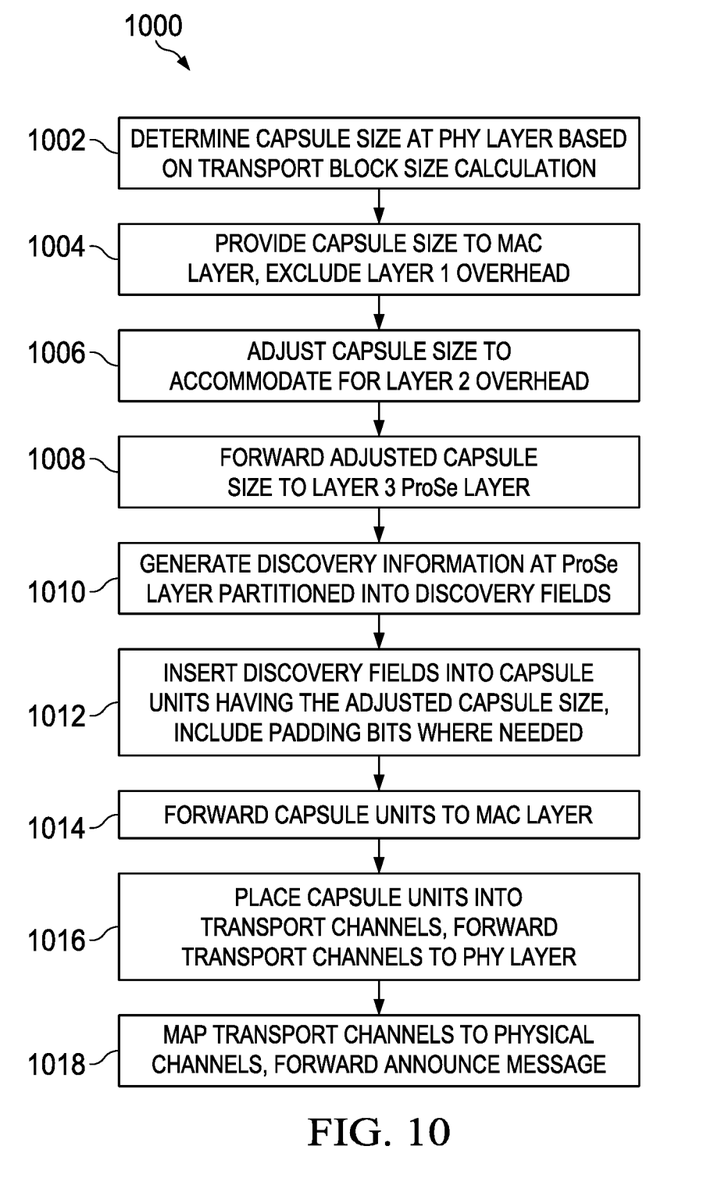
FIG. 10 illustrates a process for providing a capsule size from lower layers of the protocol layer architecture to the upper layer.

FIG. 10 shows a process 1000 for determining and providing a capsule size and forming the capsule units. Process 1000 begins at block 1002 by identifying a capsule size from a transport block size determined at the PHY protocol layer using a discovery modulation code scheme (MCS) and discovery resource size in resource blocks (RBs) assigned to UE 110 by eNodeB 106. The PHY layer protocol provides the capsule size to the MAC layer protocol at block 1004, excluding bits required for Layer 1 overhead. At block 1006, the MAC layer protocol adjusts the capsule size to accommodate for Layer 2 overhead bits and forwards the adjusted capsule size at block 1008 to the ProSe layer protocol. At block 1010, the ProSe layer protocol generates discovery information, partitioning the discovery information into a plurality of discovery fields. The ProSe layer protocol inserts the discovery fields into capsule units at block 1012 each having the adjusted capsule size. The ProSe layer protocol inserts padding bits when discovery fields do not occupy the entire size of the capsule unit. Further, the ProSe layer protocol ensures that an individual discovery field is not transported using two capsule units. At block 1014, the ProSe layer protocol forwards the capsule units to the MAC layer protocol. The MAC layer protocol places the capsule units into transport channels at block 1016 and forwards the transport channels to the PHY layer protocol. No processing of the discovery information in the capsule units is performed by the MAC layer protocol. At block 1018, the PHY layer protocol maps the transport channels into physical channels for transmission as, for example, an announce message. No processing of the discovery information in the capsule units is performed by the PHY layer protocol. At a receiving UE 110, the capsule units are transparently forwarded through the PHY layer and MAC layer protocols. The ProSe layer protocol at the receiving UE 110 extracts the discovery information from the capsule units for discovery processing.

In summary, the above approach supports extensibility of discovery information while allowing the size of the capsule units transporting discovery information to be flexible and dictated by the PHY layer protocol performance. As a result, the discovery message and discovery information sizes are somewhat independent of each other. Further, the advantage of Layer 2 protocol transparency to discovery information is retained.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. For example, though discussed in terms of ProSe direct discovery, particular embodiments described herein may apply to other discovery techniques. Accordingly, the above description of example embodiments does not define or constrain this disclosure. Other changes, substitutions, and alterations are also possible without departing from the scope of this disclosure as defined by the following claims.

What is claimed is:

1. A method for providing an extensible solution for device to device discovery message size in a cellular network, comprising:
    obtaining, by a user equipment from an eNodeB, resource blocks assigned to the user equipment;
    determining a discovery message capsule size based on a discovery modulation and coding scheme (MCS) in the resource blocks assigned to the user equipment and a discovery resource size in the resource blocks assigned to the user equipment, by a layer one layer of the user equipment operating in the cellular network;
    forwarding the discovery message capsule size to a layer two layer of the user equipment;
    adjusting the discovery message capsule size to accommodate layer two overhead by the layer two layer of the user equipment, to produce an adjusted capsule size;
    forwarding, from the layer two layer of the user equipment, the adjusted capsule size to a layer three layer of the user equipment; and
    transmitting, by the user equipment to a plurality of user equipments, a discovery message comprising one or more capsule units, wherein the one or more capsule units have the adjusted capsule size.

2. The method of claim 1, further comprising:
    generating discovery information by the layer three layer; and
    placing the discovery information in the one or more capsule units, each capsule unit having the adjusted capsule size.

3. The method of claim 2, further comprising:
    forwarding the one or more capsule units to the layer two layer for placement into transport channels, the discovery information being transparent to layer two layer processing.

4. The method of claim 2, wherein the discovery information is partitioned into a plurality of fields, the discovery information being placed into the one or more capsule units such that no individual field is separated into two capsule units.

5. The method of claim 4, wherein the adjusted capsule size is at least equal to a size of a largest field of the discovery information.

6. The method of claim 4, wherein stuff bits are placed into a particular capsule unit in response to one or more fields placed into the particular capsule unit not fully occupying the particular capsule unit.

7. The method of claim 1, wherein the adjusted capsule size does not include layer one overhead.

8. The method of claim 2, wherein the discovery information is generated to accommodate any one of open discovery, restricted discovery, public safety use, or non-public safety use.

9. The method of claim 1, wherein the discovery message capsule size at the layer one layer is determined from a transport block size calculated from a modulation code scheme assigned to the user equipment and the resource blocks.

10. A non-transitory computer-readable medium including code for providing an extensible solution for device to device discovery message size in a cellular network, the code upon execution operable to:
obtain, by a user equipment from an eNodeB, resource blocks assigned to the user equipment;
determine a discovery message capsule size based on a discovery modulation and coding scheme (MCS) in the resource blocks assigned to the user equipment and a discovery resource size in the resource blocks assigned to the user equipment, by a layer one layer of the user equipment operating in the cellular network;
forward the discovery message capsule size to a layer two layer of the user equipment;
adjust the discovery message capsule size to accommodate layer two overhead by the layer two layer of the user equipment to produce an adjusted capsule size;
forward, from the layer two layer of the user equipment, the adjusted capsule size to a layer three layer of the user equipment; and
transmit, by the user equipment to a plurality of user equipments, a discovery message comprising one or more capsule units, wherein the one or more capsule units have the adjusted capsule size.

11. The non-transitory computer-readable medium of claim 10, wherein the code is further operable to:
generate discovery information by the layer three layer; and
place the discovery information in the one or more capsule units, each capsule unit having the adjusted capsule size.

12. The non-transitory computer-readable medium of claim 11, wherein the code is further operable to:
forward the one or more capsule units to the layer two layer for placement into transport channels, the discovery information being transparent to layer two layer processing.

13. The non-transitory computer-readable medium of claim 11, wherein the discovery information is partitioned into a plurality of fields, the discover information being placed into the one or more capsule units such that no individual field is separated into two capsule units.

14. The non-transitory computer-readable medium of claim 13, wherein the adjusted capsule size is at least equal to a size of a largest field of the discovery information.

15. The non-transitory computer-readable medium of claim 13, wherein padding bits are placed into a particular capsule unit in response to one or more fields placed into the particular capsule unit not fully occupying the adjusted capsule size for particular capsule unit.

16. The non-transitory computer-readable medium of claim 10, wherein the adjusted capsule size does not include layer one overhead.

17. The non-transitory computer-readable medium of claim 11, wherein the discovery information is generated to accommodate any one of open discovery, restricted discovery, public safety use, or non-public safety use.

18. The non-transitory computer-readable medium of claim 10, wherein the discovery message capsule size at the layer one layer is determined from a transport block size calculated from a modulation code scheme assigned to the user equipment and the resource blocks.

19. A method comprising:
obtaining, by a user equipment from an NodeB, resource blocks assigned to the user equipment;
determining a discovery message capsule size based on a discovery modulation and coding scheme (MCS) in the resource blocks assigned to the user equipment and a discovery resource size in the resource blocks assigned to the user equipment;
adjusting the discovery message capsule size to accommodate layer two overhead to produce an adjusted capsule size;
generating discovery information;
placing, by a layer three layer of the user equipment, the discovery information in a capsule unit having the adjusted capsule size; and
transmitting, by the user equipment to a plurality of user equipments, a discovery message comprising the capsule unit, wherein the capsule unit has the adjusted capsule size.

20. The method of claim 3, further comprising:
placing, by the layer two layer of the user equipment, the one or more capsule units into the transport channels, no processing of the discovery information in the one or more capsule units being performed by the layer two layer of the user equipment;
forwarding, by the layer two layer of the user equipment, the transport channels to the layer one layer of the user equipment; and
mapping, by the layer one layer of the user equipment, the transport channels into physical channels for transmission, no processing of the discovery information in the one or more capsule units being performed by the layer one layer of the user equipment.

* * * * *